United States Patent
Islam et al.

(10) Patent No.: US 8,960,020 B2
(45) Date of Patent: Feb. 24, 2015

(54) NON-CONTACTING TORQUE SENSOR WITH INJECTION MOLDED MAGNETS

(71) Applicants: Mohammad S. Islam, Saginaw, MI (US); Mazharul H. Chowdhury, Midland, MI (US)

(72) Inventors: Mohammad S. Islam, Saginaw, MI (US); Mazharul H. Chowdhury, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 50 days.

(21) Appl. No.: 13/836,922

(22) Filed: Mar. 15, 2013

(65) Prior Publication Data

US 2014/0260683 A1 Sep. 18, 2014

(51) Int. Cl.
*G01L 3/00* (2006.01)
*G01L 3/14* (2006.01)
*G01L 3/10* (2006.01)
*G01L 5/22* (2006.01)

(52) U.S. Cl.
CPC ............... *G01L 3/104* (2013.01); *G01L 5/221* (2013.01)
USPC ............................ 73/862.325; 73/862.321

(58) Field of Classification Search
CPC ........... G01L 3/104; G01L 3/101; G01L 3/10; G01L 3/102; G01L 25/003; B62D 6/10
USPC ....................................... 73/862.325, 862.321
See application file for complete search history.

(56) References Cited

U.S. PATENT DOCUMENTS

| 2005/0172727 A1* | 8/2005 | Pattok et al. ..................... 73/799 |
| 2005/0172732 A1 | 8/2005 | Feng et al. |
| 2009/0027045 A1* | 1/2009 | Islam et al. ............... 324/207.13 |

FOREIGN PATENT DOCUMENTS

| EP | 2020590 A2 | 4/2009 |
| EP | 2455735 A1 | 5/2012 |
| EP | 2020590 A3 | 12/2012 |

OTHER PUBLICATIONS

Didier Angleviel, Didier Frachon, and Gerald Masson; Moving Magnet Technologies S.A.; "Development of a Contactless Hall effect torque sensor for Electric Power Steering"; 2006-01-0939; Copyright 2005 SAE International; 8 pages.
European Search Report for related European Patent Application No. 14158867.3, dated Sep. 15, 2014, 6 pages.

* cited by examiner

*Primary Examiner* — Lisa Caputo
*Assistant Examiner* — Jamel Williams
(74) *Attorney, Agent, or Firm* — Cantor Colburn LLP

(57) ABSTRACT

A non-contacting torque sensor comprises a magnetic flux generating rotor and a magnetic flux detecting probe. The magnetic flux generating rotor is disposed axially between a first stator and a second stator and has a radially outboard surface and plurality of N pole magnets and S pole magnets alternatingly disposed proximate the radially outboard surface. Each stator has a plurality of stator teeth, with each one of said plurality of stator teeth corresponding to a unique one of said plurality of N pole magnets and S pole magnets. The magnetic flux detecting probe is disposed at a distance from the radially outboard surface and configured for detecting variations in magnetic flux produced by the magnetic flux generating rotor to detect a change of a relative twist between the magnetic flux generating rotor and the first stator and second stator. The N pole magnets and S pole magnets are injection molded.

20 Claims, 4 Drawing Sheets

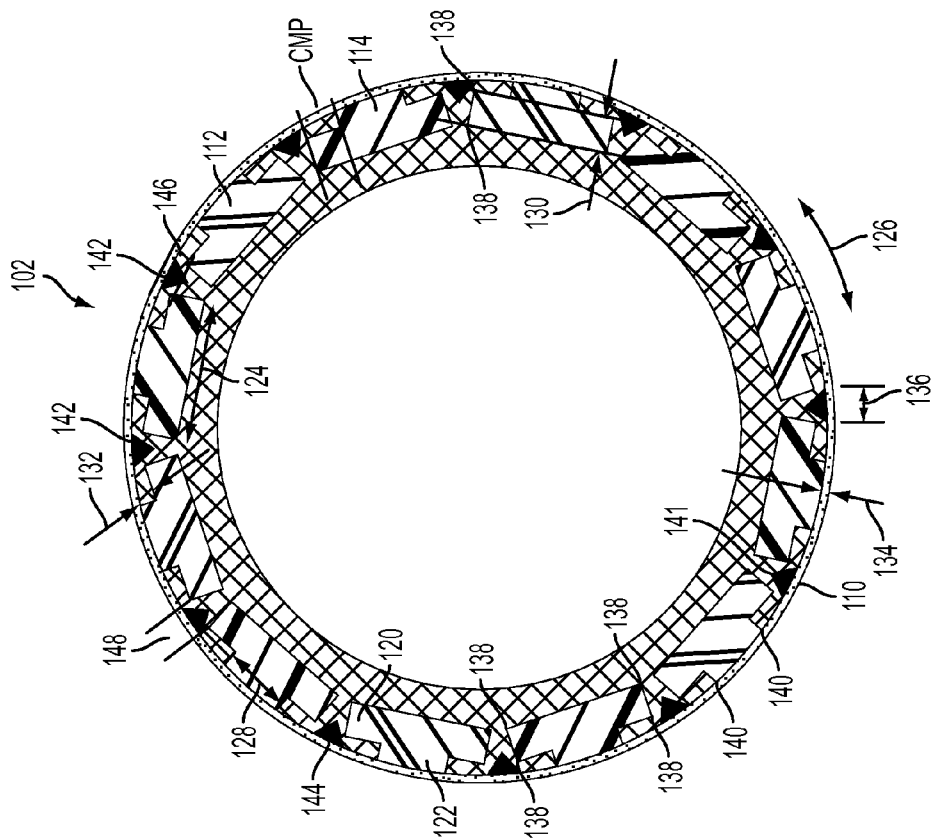
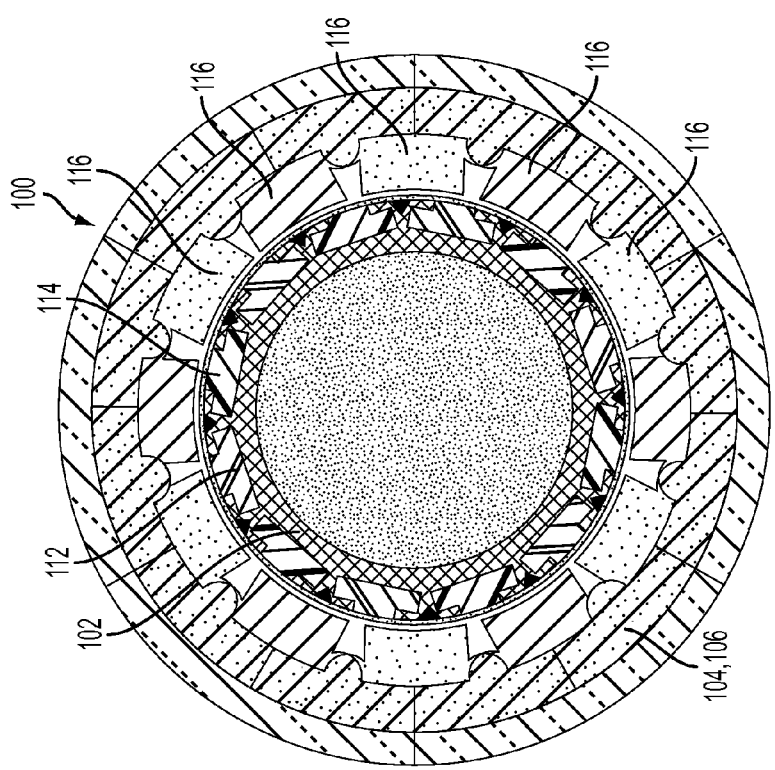

NON-CONTACTING TORQUE SENSOR WITH INJECTION MOLDED MAGNETS

BACKGROUND OF THE INVENTION

The present invention relates to torque sensors and more particularly to a small diameter torque sensor having injection molded magnets disposed on a substrate rotor.

In a conventional torque sensor, a torque is sensed as it causes a rotational deformation in a shaft, upon which the torque acts. As the shaft deforms, a difference develops between the angular positions of the shaft at locations along the shaft. A non-contacting small diameter torque sensor provides a flux density output that depends upon the change in angular position between a first shaft position and a second shaft position. When it is desired to measure a torque applied to a shaft, such as a control shaft of an electric steering system of a vehicle, an upper segment of the steering control shaft and a lower segment of the steering control shaft may be coupled by a torsion bar torque sensor such that a torque applied to the steering wheel may be determined and provided to a controller to aid in controlling torque assistance to be supplied to the steering system.

In such systems, it is generally desirable to have a non-contacting torque sensor that provides relatively high magnetic field (Gauss/deg) and rotational accuracy (low harmonic/rev). Unfortunately, previous attempts to satisfy these requirements have succeeded in improving magnetic field response but have also entailed significant cost, manufacturing complexity, and signal noise (i.e., ripple). One reason for these drawbacks of conventional small diameter torque sensors is their reliance on traditional radially-oriented, sintered, neodymium magnets to create the magnetic field that is used as the input to the sensor. The cost of sintered neodymium magnets is very high and this in turn increase the manufacturing cost of the torque sensor.

Accordingly, it is desirable to have a non-contacting torque sensor that provides relatively high magnetic field and rotational accuracy without the cost associated with sintered neodymium magnets.

SUMMARY OF THE INVENTION

In one exemplary embodiment of the invention, a non-contacting torque sensor comprises a magnetic flux generating rotor and a magnetic flux detecting probe. The magnetic flux generating rotor is disposed axially between a first stator and a second stator and has a radially outboard surface and plurality of N pole magnets and S pole magnets alternatingly disposed proximate the radially outboard surface. Each stator has a plurality of stator teeth, with each one of said plurality of stator teeth corresponding to a unique one of said plurality of N pole magnets and S pole magnets. The magnetic flux detecting probe is disposed at a distance from the radially outboard surface and configured for detecting variations in magnetic flux produced by the magnetic flux generating rotor to detect a change of a relative twist between the magnetic flux generating rotor and the first stator and second stator. The N pole magnets and S pole magnets are injection molded.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 shows an axial view of an exemplary small diameter torque sensor with a rotor that comprises injection molded magnets;

FIG. 2 shows an axial view of an exemplary rotor that comprises injection molded magnets;

DETAILED DESCRIPTION

Figure 3:
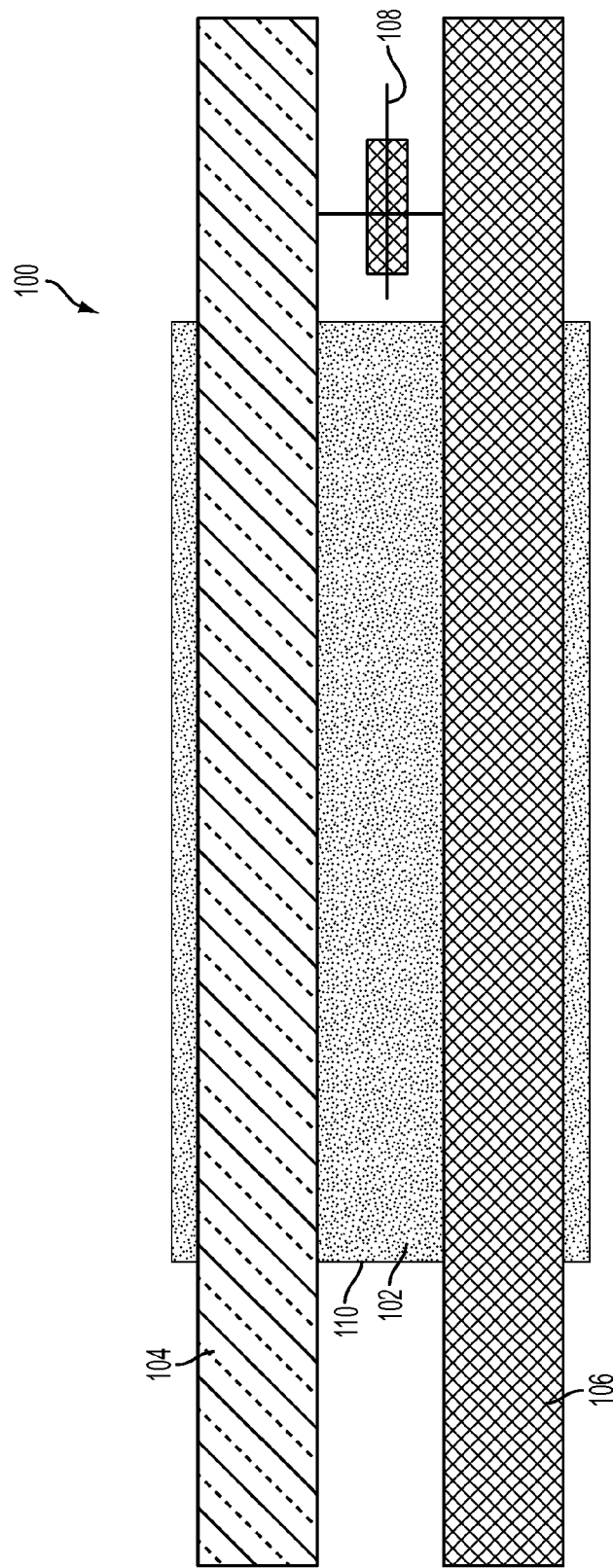
FIG. 3 shows a radial (side) view of an exemplary small diameter torque sensor with a probe positioned to measure a flux density output from the sensor.
Figure 5:
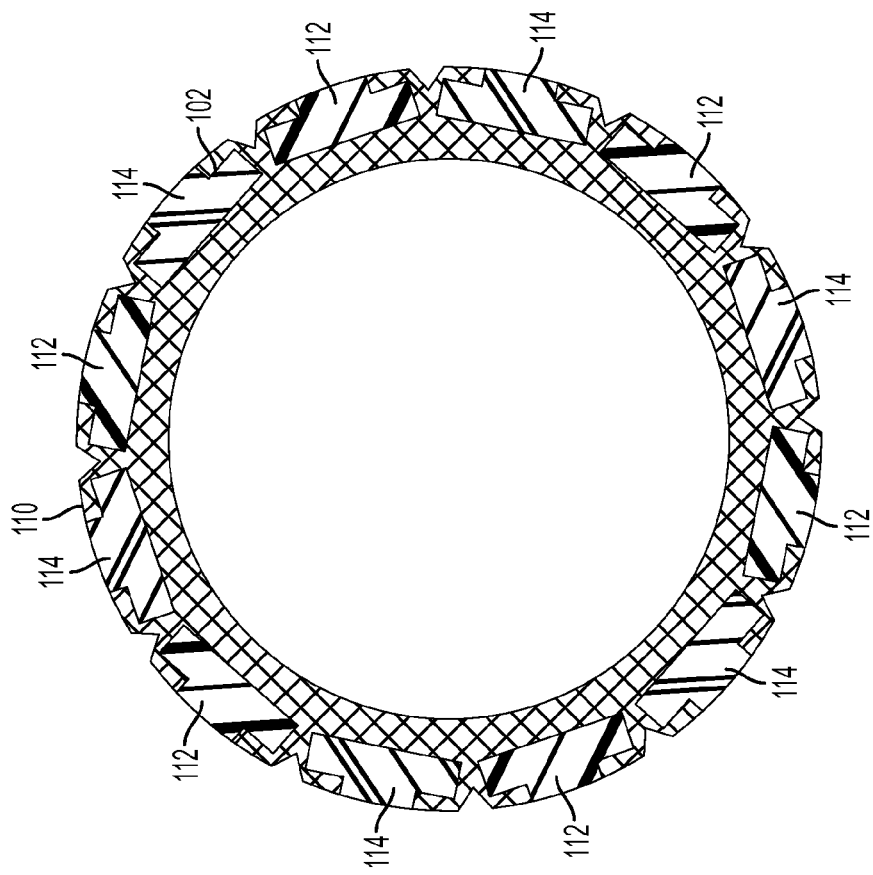
FIG. 5 shows an axial view of an exemplary rotor that comprises injection molded magnets.
Figure 4:
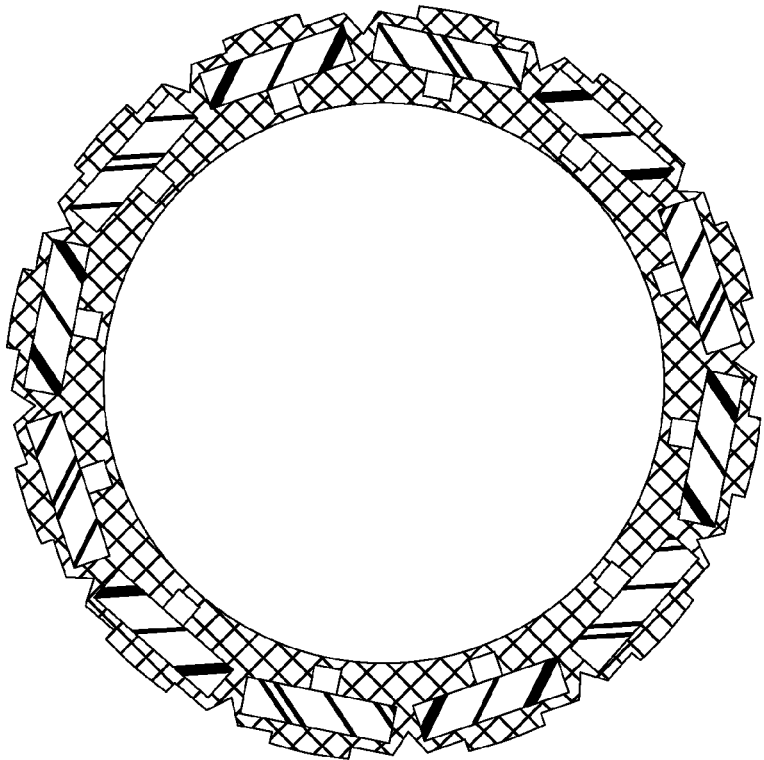
FIG. 4 shows an axial view of a rotor that comprises traditional sintered neodymium magnets.

Referring now to the Figures, where the invention will be described with reference to specific embodiments, without limiting same, as shown in FIG. 1 and FIG. 3, in an exemplary embodiment, a non-contacting torque sensor 100 comprises a magnetic flux generating rotor 102 disposed axially between a first stator 104 and a second stator 106. The non-contacting torque sensor 100 also comprises a magnetic flux detecting probe 108. As shown in FIG. 2, in an exemplary embodiment, a magnetic flux generating rotor 102 has a radially outboard surface 110 and plurality of N pole magnets 112 and S pole magnets 114 alternatingly disposed proximate the radially outboard surface 110. As shown in FIG. 1, each stator 104, 106 has a plurality of stator teeth 116, with each one of the plurality of stator teeth 116 corresponding to a unique one of the plurality of n pole magnets 112 and s pole magnets 114.

As shown in FIG. 3, the magnetic flux detecting probe 108 is disposed at a distance 118 from the radially outboard surface 110. The magnetic flux detecting probe 108 is configured for detecting variations in magnetic flux produced by the magnetic flux generating rotor 102 to detect a change of a relative twist between the magnetic flux generating rotor 102 and the first stator 104 and second stator 106. The plurality of n pole magnets 112 and s pole magnets 114 may be injection molded.

In an exemplary embodiment, the magnetic flux generating rotor 102 may be coupled to an input shaft of a steering system (not shown) while the stators are coupled to an output shaft of the steering system (not shown). Thus, the non-contacting torque sensor 100 is installed between the input shaft, which may be connected to a steering wheel, and the output shaft, which is connected to a steerable wheel of the vehicle, whereby a twist in the torque sensor may be detected, and from which a torque in the shafts may be deduced.

In an exemplary embodiment, each of the plurality of n pole magnets 112 and s pole magnets 114 includes an inner section 120 and an outer section 122, the inner section 120 being disposed radially inward from the outer section 122 and the outer section 122 being disposed radially outward from the inner section 120. The inner section 120 has an inner section length 124 (i.e., a magnet length) in a circumferential direction 126, and the outer section 122 similarly defines an outer section length 128 (i.e., a magnet opening) in the circumferential direction 126. It should be appreciated that variations of the relationships between the inner section length 124 and the outer section length 128 may impact the flux generating characteristics of the magnetic flux generating rotor 102. In one embodiment, the inner section length 124 is greater than the outer section length 128. In another embodiment, the inner section length 124 is at least 20 percent greater than the outer section length 128. In yet another exemplary embodiment, the inner section length 124 is at least 50 percent greater than the outer section length 128, and in yet another exemplary embodiment, the inner section length 124 is at least twice as great as the outer section length 128.

In addition to variations in the lengths of the magnet sections in the circumferential direction 126, heights of each of the magnet sections may also be adjusted to achieve desired flux generating characteristics of the magnetic flux generating rotor 102. For example, in one embodiment, the inner section 120 has an inner section height 130 in a radial direction, the outer section 122 has an outer section height 132 in the radial direction, and the inner section height 130 is greater than the outer section length 128. In another embodiment, the inner section height 130 is at least 20 percent greater than the outer section height 132. In yet another embodiment, the inner section height 130 is at least 50 percent greater than the outer section height 132. The inner section height 130 may also be at least twice as great as the outer section height 132.

In an exemplary embodiment, each of the plurality of n pole magnets 112 and s pole magnets 114 is disposed so as to define a rotor clearance 134 between its outer edge and the radially outboard surface 110, and the rotor clearance 134 is less than half of the outer section height 132. It should be appreciated that each of the plurality of n pole magnets 112 and s pole magnets 114 may be disposed so as to define a space 136 between the magnets at the outer edge of the inner section 120 along the circumferential direction 126. In an exemplary embodiment, the space 136 between the magnets at the outer edge of the inner section 120 along the circumferential direction 126 is approximately equal to the inner section height 130.

In an exemplary embodiment, each of the plurality of n pole magnets 112 and s pole magnets 114 has an inner section 120 that has corners 138 that are square. In another embodiment, each of the plurality of n pole magnets 112 and s pole magnets 114 has an outer section 122 that has corners 140 that are square.

In an exemplary embodiment, the radially outboard surface 110 of the magnetic flux generating rotor 102 is substantially cylindrical and defines a plurality of notches 142, each notch 142 of the plurality of notches 142 being disposed between two adjacent magnets of the plurality of n pole magnets 112 and s pole magnets 114. For example, the radially outboard surface 110 may define one notch 142 for each magnet of the plurality of n pole magnets 112 and s pole magnets 114. In one embodiment, the plurality of n pole magnets 112 and s pole magnets 114 comprises twelve magnets, and the plurality of notches 142 comprises twelve notches 142.

In an exemplary embodiment, each notch 142 of the plurality of notches 142 is V-shaped having a central angle 144 of approximately 30 degrees. In another embodiment, each notch 142 of the plurality of notches 142 is V-shaped having a central angle 144 of approximately 45 degrees.

As mentioned above, the radially outboard surface 110 is substantially cylindrical and defines a plurality of notches 142, each notch 142 of the plurality of notches 142 being disposed between two adjacent magnets of the plurality of n pole magnets 112 and s pole magnets 114. In an exemplary embodiment, each notch 142 of the plurality of notches 142 may have a depth 146 that is approximately equal to the outer section height 132. In addition each notch 142 of the plurality of notches 142 may have a width 148 that is approximately equal to the inner section height 130.

Thus, the key design features of an injected molded magnet may be developed to produce a torque sensor providing suitable performance while utilizing injection molded magnets at lower cost than conventional sensors. As shown in the figures design features may be adjusted in terms of the shapes and dimensions of the magnets, the magnet opening, the number of notches 142 around the magnets in the outer arc of the rotor, the shapes of the notches 142, the notch opening dimensions, the notch depth 146, the minimum distance 134 between the magnet 112 and the outer rotor radius, the shaping of the magnet corners 138, the magnet length, the corner width profile of the magnet and the corner width profile of the magnet opening.

Figure 6:
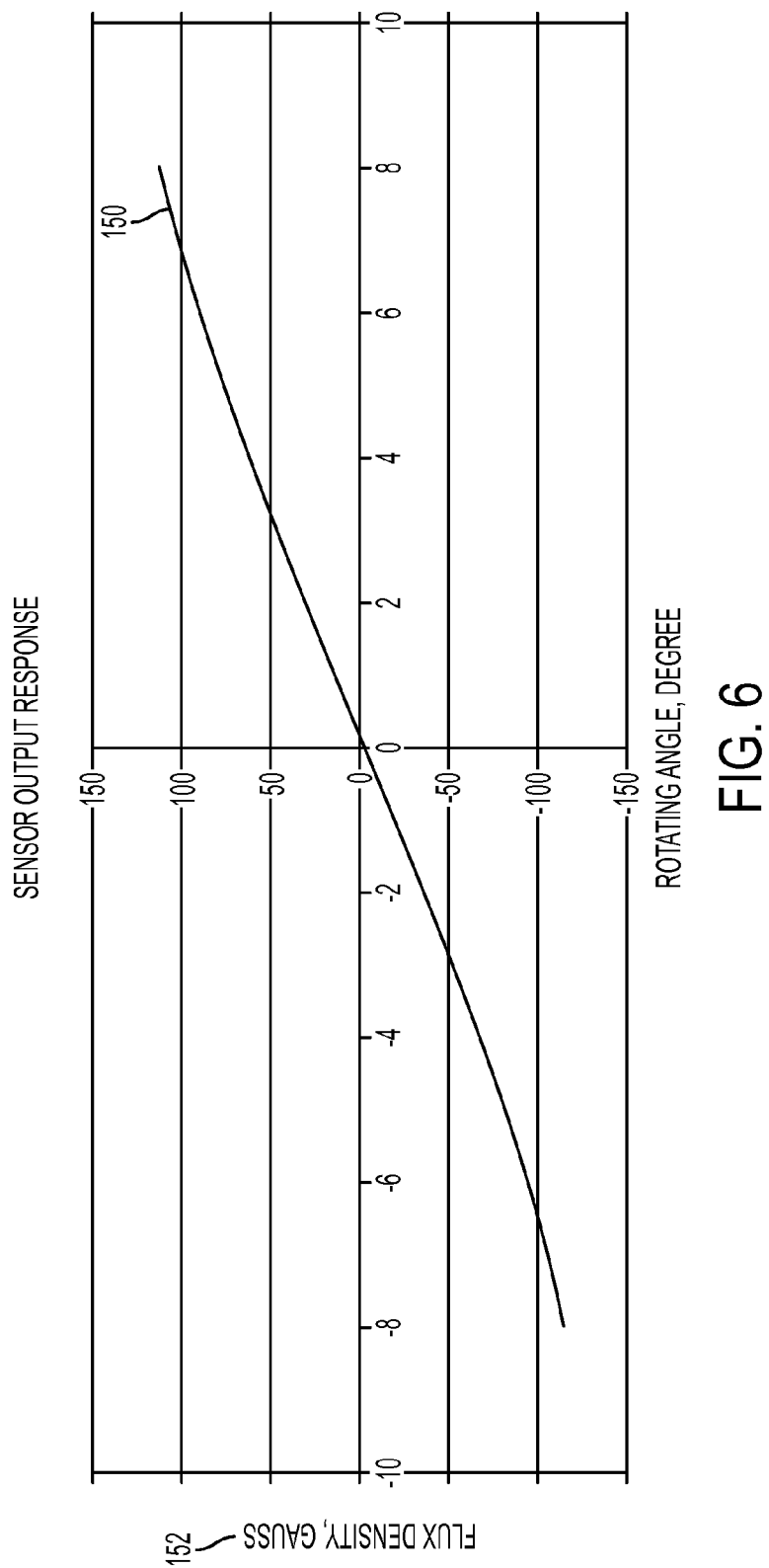
FIG. 6 shows an output response curve of an exemplary small diameter torque sensor with a rotor that comprises injection molded magnets.

The magnet shaping parameters such as shaping of the magnet corners, minimum distance between the magnet and the outer rotor radius, corner width profile of the inner section and corner width profile of the outer section may be adjusted to improve the response of the sensor output while reducing the ripple. The number and position of the notches 142 has influence on the sensor response and ripple. The combination of features and elements shown in the figures provides a robust and cost effective small diameter torque sensor. FIG. 6 shows the output response curve 150 of the illustrated sensor. As shown in FIG. 6, the flux density 152 produced by the injection-molded sensor is approximately 66 G at 4 degree. The response curve is linear within the operating limit (+/−4 Degree). The ripple is about 5~6 Gauss at 4 Degrees. It should be appreciated that these characteristics are similar to results produced using more expensive traditional magnets.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A non-contacting torque sensor comprising:
   a magnetic flux generating rotor disposed axially between a first stator and a second stator; and
   a magnetic flux detecting probe;
   the magnetic flux generating rotor having a radially outboard surface and plurality of N pole magnets and S pole magnets alternatingly disposed proximate the radially outboard surface;
   each stator having a plurality of stator teeth, with each one of said plurality of stator teeth corresponding to a unique one of said plurality of N pole magnets and S pole magnets;
   the magnetic flux detecting probe disposed at a distance from the radially outboard surface and configured for detecting variations in magnetic flux produced by the magnetic flux generating rotor to detect a change of a relative twist between the magnetic flux generating rotor and the first stator and second stator;
   wherein the plurality of N pole magnets and S pole magnets is injection molded.

2. A non-contacting torque sensor as claimed in claim 1:
   wherein each of the plurality of N pole magnets and S pole magnets includes an inner section and an outer section, the inner section being disposed radially inward from the outer section and the outer section being disposed radially outward from the inner section; and wherein the inner section has an inner section length in a circumferential direction, wherein the outer section has an outer section length in the circumferential direction, and wherein the inner section length is greater than the outer section length.

3. A non-contacting torque sensor as claimed in claim 2, wherein the inner section length is at least 20 percent greater than the outer section length.

4. A non-contacting torque sensor as claimed in claim 2, wherein the inner section length is at least 50 percent greater than the outer section length.

5. A non-contacting torque sensor as claimed in claim 2, wherein the inner section length is at least twice as great as the outer section length.

6. A non-contacting torque sensor as claimed in claim 2:
wherein each of the plurality of N pole magnets and S pole magnets includes an inner section and an outer section, the inner section being disposed radially inward from the outer section and the outer section being disposed radially outward from the inner section; and
wherein the inner section has an inner section height in a radial direction, wherein the outer section has an outer section height in the radial direction, and wherein the inner section height is greater than the outer section length.

7. A non-contacting torque sensor as claimed in claim 6, wherein the inner section height is at least 20 percent greater than the outer section height.

8. A non-contacting torque sensor as claimed in claim 6, wherein the inner section height is at least 50 percent greater than the outer section height.

9. A non-contacting torque sensor as claimed in claim 6, wherein the inner section height is at least twice as great as the outer section height.

10. A non-contacting torque sensor as claimed in claim 6:
wherein each of the plurality of N pole magnets and S pole magnets is disposed so as to define a rotor clearance between its outer edge and the radially outboard surface; and
wherein the rotor clearance is less than half of the outer section height.

11. A non-contacting torque sensor as claimed in claim 10, wherein each of the plurality of N pole magnets and S pole magnets is disposed so as to define a space between the magnets a the outer edge of the inner section along the circumferential direction, the space being approximately equal to the inner section height.

12. A non-contacting torque sensor as claimed in claim 1, wherein each of the plurality of N pole magnets and S pole magnets has an inner section that has corners that are square.

13. A non-contacting torque sensor as claimed in claim 1, wherein each of the plurality of N pole magnets and S pole magnets has an outer section that has corners that are square.

14. A non-contacting torque sensor as claimed in claim 1, wherein the radially outboard surface is substantially cylindrical and defines a plurality of notches, each notch of the plurality of notches being disposed between two adjacent magnets of the plurality of N pole magnets and S pole magnets.

15. A non-contacting torque sensor as claimed in claim 14:
wherein the radially outboard surface defines one notch for each magnet of the plurality of N pole magnets and S pole magnets.

16. A non-contacting torque sensor as claimed in claim 15:
wherein the plurality of N pole magnets and S pole magnets comprises twelve magnets; and
wherein the plurality of notches comprises twelve notches.

17. A non-contacting torque sensor as claimed in claim 14, wherein each notch of the plurality of notches is V-shaped having a central angle of approximately 30 degrees.

18. A non-contacting torque sensor as claimed in claim 14, wherein each notch of the plurality of notches is V-shaped having a central angle of approximately 45 degrees.

19. A non-contacting torque sensor as claimed in claim 6;
wherein the radially outboard surface is substantially cylindrical and defines a plurality of notches, each notch of the plurality of notches being disposed between two adjacent magnets of the plurality of N pole magnets and S pole magnets; and
wherein each notch of the plurality of notches is having a depth that is approximately equal to the outer section height.

20. A non-contacting torque sensor as claimed in claim 6;
wherein the radially outboard surface is substantially cylindrical and defines a plurality of notches, each notch of the plurality of notches being disposed between two adjacent magnets of the plurality of N pole magnets and S pole magnets; and
wherein each notch of the plurality of notches is having a width that is approximately equal to the inner section height.

* * * * *